Jan. 9, 1968   P. E. BUTZIN ET AL   3,362,445
BAND SAW
Filed March 8, 1966   2 Sheets-Sheet 1
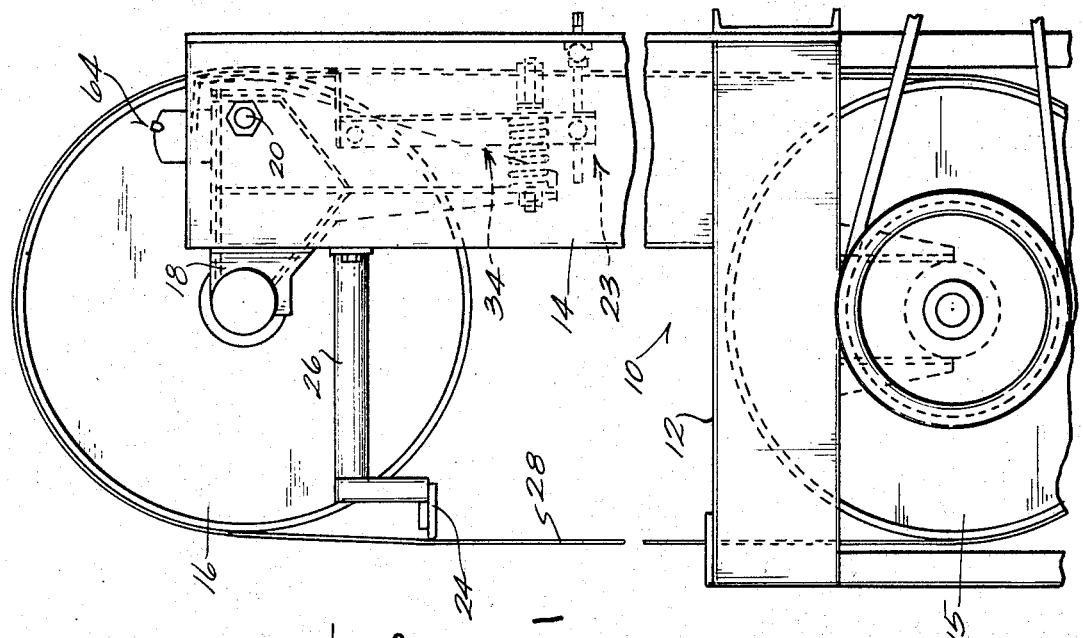
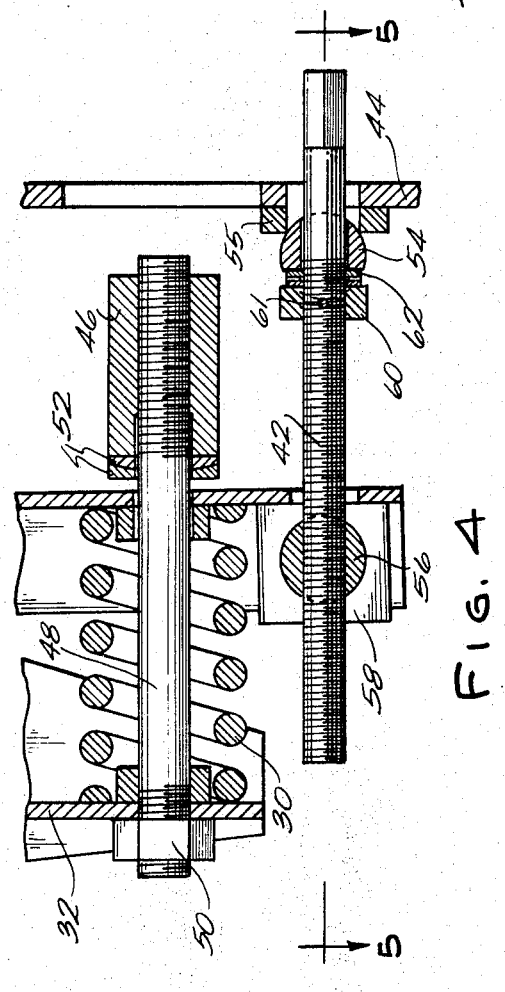
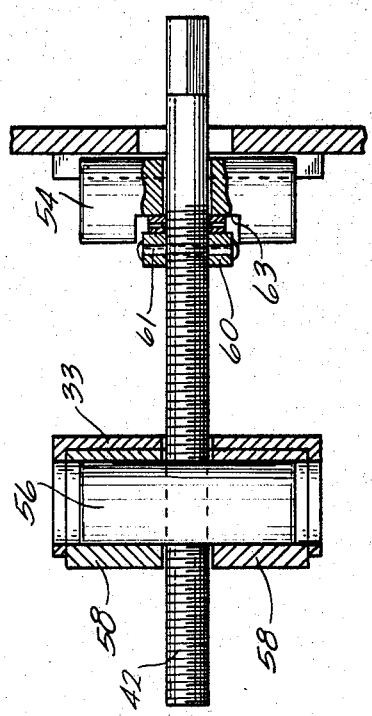
INVENTORS
PAUL E. BUTZIN
WILLIAM A. ESCHENBURG.
BY
ATTORNEY Jan. 9, 1968  P. E. BUTZIN ET AL  3,362,445
BAND SAW
Filed March 8, 1966  2 Sheets-Sheet 2
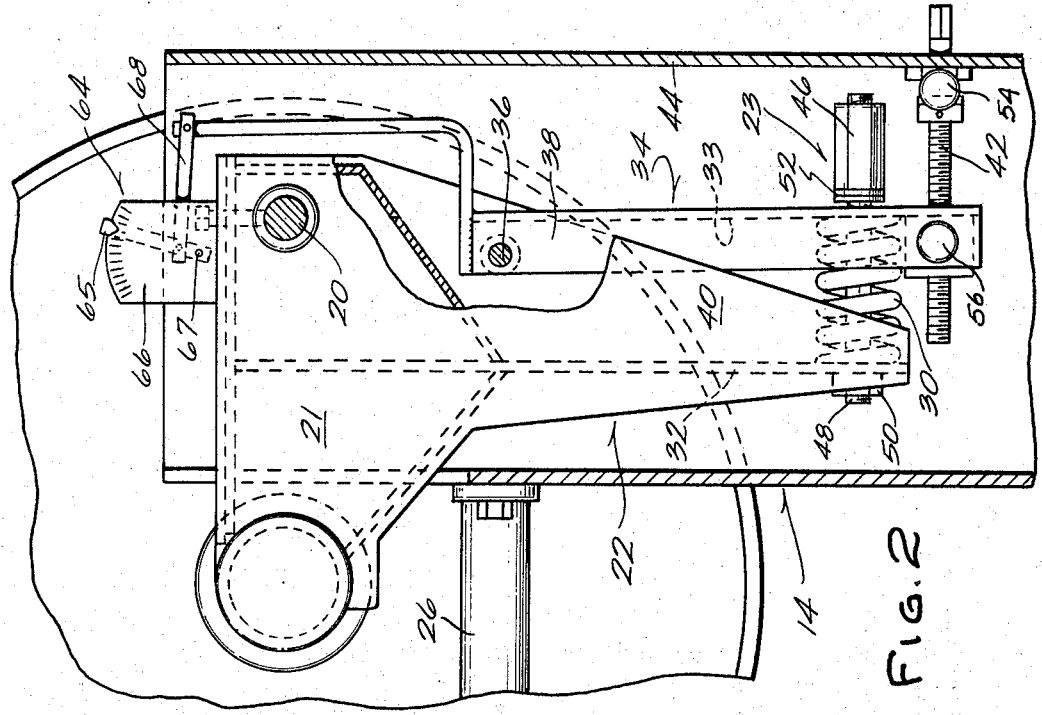
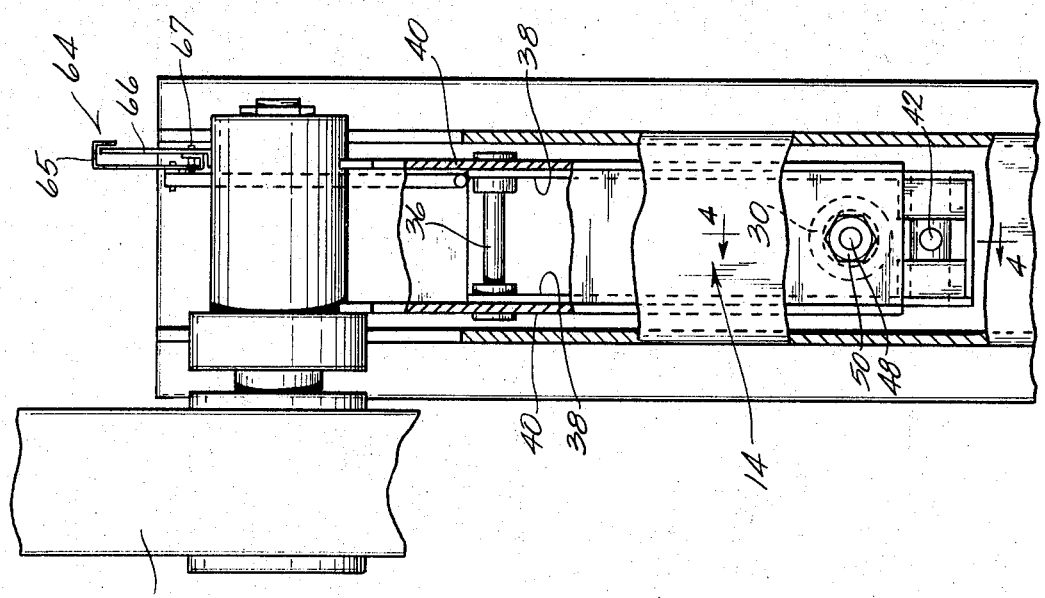
INVENTORS
PAUL E. BUTZIN
WILLIAM A. ESCHENBURG
BY Andrew O. Riteris
ATTORNEY United States Patent Office 3,362,445
Patented Jan. 9, 1968

3,362,445
BAND SAW
Paul E. Butzin, Wauwatosa, and William A. Eschenburg, Milwaukee, Wis., assignors to The Filer and Stowell Company, Milwaukee, Wis., a corporation of Wisconsin
Filed Mar. 8, 1966, Ser. No. 532,746
8 Claims. (Cl. 143—27)

This invention pertains to improvements in band saws and particularly to improvements in a spring biased mechanism employed in changing the relative distance between the two wheels of the saw as well as in providing the tension force to the saw blade which is carried by the wheels.

One of the principal objects of the present invention is to provide a spring loaded adjustment mechanism which will provide a tension load on the saw blades used with the saw, as well as permit changes in such loads; and which also will be capable of lowering and elevating the upper wheel without necessitating substantial unloading of the spring components which provide the tension load.

A further object of the present invention is to provide a band saw having a load indicator which will be equally well suited for the various length saw blades which may be used with the saw.

A further object of this invention is to provide a band saw which will be of less complex construction yet which will be equal in its operation to similar type band saws known heretofore.

In a broad sense these objects are attained by mounting the upper wheel on a sub-frame which is pivotally connected to the main frame of the mill, and by providing a mechanism for pivoting the sub-frame (to vary the height of the upper wheel) while maintaining the spring structure under a preload which can be just slightly under that required for proper tensioning of the blade.

As will be apparent to those skilled in this art, the design of the present band saw is significantly less complex than the prior art saws employing knife edge straining devices. Also, the range of adjustment of the upper wheel is much larger in the present mill than those commonly used heretofore. A further important advantage of the present band saw is that the changing of blades, which usually has to be done at least twice a day, has been greatly simplified. With prior art saws the spring structure had to be completely unloaded when lowering the idler wheel and again fully loaded after the new blade had been put on the wheels. Because the present band saw incorporates a preload feature, the tension load on a saw blade can be removed by changing the spring structure from an actual spring load, which may be 10,000 pounds, to the preload which might be 9,000 pounds. Thereafter the upper wheel can be lowered without any further unloading of the spring structure. When a new blade is installed, the upper wheel need only be raised until the saw blade is taut at which time only 1,000 pounds need be added to the load to reach the desired 10,000 pounds.

Other objects and advantages will be pointed out in, or be apparent from, the specification and claims, as will obvious modifications of the single embodiment shown in the drawings, in which:

FIG. 1 is a side view of the band saw embodying the present invention with portions being broken away for the sake of clarity;

FIG. 2 is an enlarged side view of the adjusting end straining mechanism embodying the present invention;

FIG. 3 is a side view of the structure shown in FIG. 2 with portions being broken away for the sake of clarity;

FIG. 4 is an enlarged cross-sectional view taken on line 4—4 of FIG. 3; and

FIG. 5 is a cross-sectional view taken on line 5—5 of FIG. 4.

The best overall view of the band saw is shown in FIG. 1. Essentially, the band saw is comprised of a main frame 10 having a horizontal working table 12 and an upstanding box type column 14. A driven lower wheel 15 is fixed to the frame 10 and an upper idler wheel 16 is rotatably mounted on a sub-frame 18 which is pivotally connected to the column through a shaft 20. As best seen in FIG. 2, the sub-frame 18 is somewhat L-shaped having a generally horizontally extending leg 21 which carries the wheel 16 and a downwardly extending leg 22 which is connected to the column through a spring biased adjusting mechanism 23. The pivotal connection through shaft 20 is at the juncture of the two legs. Thus any movement of the leg 22 will cause a corresponding movement of the wheel 16. It should be noted that a guide member 24 is mounted on an arm 26 which is fixed to the column of the main frame. This structure, of course, maintains the transverse position of the band saw blade 28 constant independently of the position of the wheel 16.

The adjusting mechanism 23 has two functions. First, it provides the desired tension load or strain on the saw blade which is necessary for proper sawing. This load on the blade is provided by the compression spring 30 which is interposed between the web 32 of the downwardly extending sub-frame 22 and the web 33 of an arm 34. The arm is pivotally connected to the sub-frame by pin 36 which extends through the flanges 38 of the arm 34 and the flanges 40 of the leg 22. The second function of the adjustment mechanism is to vary the vertical position of the upper wheel in respect to the lower wheel to thereby render the mill useable with various length band saws, as well as to permit lowering and raising of the wheel as is necessary when changing blades. This function is performed by a threaded screw 42 which is threadably connected to the lower end of the arm 34 and abuts against the back wall 44 of the column. As will be apparent from the further description of the present invention, the screw 42 is used for elevating and lowering the upper wheel during blade changes and for adjustment of the mill for different blade lengths, as well as for putting the prerequisite tension load or strain on the saw blade.

In the illustrated embodiment the adjusting mechanism is shown in a condition when a certain amount of tension load has been provided for the saw blade. The spring 30 is under compression and exerts biasing force tending to separate the lower ends of the leg 22 and arm 34. This biasing force is, of course, transferred through the sub-frame to the wheel 16 and is experienced as a tension force by the saw blade 28. The tension force experienced by the saw blade is directly related to the degree of compression of the spring 30. Thus, if the same length blade were to be maintained, but its tension load had to be increased, the screw 42 would be turned so as to cause it to pivot the arm 34 in a clockwise direction around pin 36 towards the leg 22. This pivotal motion will then cause a further compression of the spring 30 but, of course, will not result in an upward movement of the wheel 16.

The adjustment mechanism is designed to maintain the spring 30 under a preload even when the wheel 16 is lowered for the purpose of blade change or for adjusting the mill for shorter blade length. The feature is of importance since it eliminates a complete loading and unloading of the spring during each blade change. This is achieved by providing a stop member which limits the expansion of the compression spring to a length below its relaxed length. As shown, the preferred stop member is an adjustment nut 46 provided on a stud 48 which extends through the spring and the webs 32 and 33 of the leg and arm respectively. The stud is fixed to the web 32 by a nut 50 and is provided with two spherical washers 52 interposed between the faces of the web 33 and the adjustment nut 46. The adjustment nut can be turned to either increase or decrease the permissible maximum captive length of the spring and thus to vary the amount of preload provided to the adjustment structure.

The screw 42 extends freely through a pivot pin 54 which is provided between pivot blocks 55 and the inside face of the column and is threadably engaged with a pivot pin 56 which is fixed by appropriate bushings 58 to the lower end of arm 34. A nut 60 is fixed to the screw by a pin 61 and a needle bearing assembly 62 is positioned between the nut and the flat portion 63 of the pivot pin 54. This structure permits the arm 34 to be pivoted around pin 36 upon rotation of the screw 42.

When the wheel 16 is to be lowered from the position shown in the drawings the screw 42 is turned in a direction which will decrease the distance between the two pivot pins. At first the height of the wheel 16 will remain the same while the spring 30 will expand thus causing a decrease in the tension load of the blade. Thereafter the arm 34 will abut against nut 46, and further turning of the screw 42 will result in a lowering of the wheel 16. Similarly, when the wheel has to be raised the screw 42 will be turned until the upward movement is stopped by the saw blade. Further turning of the screw 42 will cause the arm 34 to be moved away from the nut 46, thus almost immediately providing a tensioning force to the blade which exceeds the preload of the spring.

As described heretofore, the tension load imposed on the saw blade is directly related to the compressed length of the spring 30, which in turn is directly proportional to the angular relationship of the arm 34 in respect to the sub-frame 18. Because of this a load scale 64 can be provided which is calibrated in units of weight and which has an index pointer 65 connected to the arm 34 for movement in accordance with the movement of the arm in respect to the sub-frame 18. The dial 66 of the scale is fixed to the top plate of the sub-frame and the pointer is pivotally fixed thereto by pin 67. A link 68 is pivotally connected to the pointer and to an upstanding rod 69 of the arm 34 and transfers the motion of the arm to the pointer. Since the load scale actually measures the angular relationship between the sub-frame and the arm 34 it is not affected by changes in the sawing height of the upper wheel.

Although but a single embodiment of the present invention has been illustrated and described, it will be apparent to those skilled in the art that various changes and modifications may be made therein without departing from the spirit of the invention or from scope of the appended claims.

We claim:
1. A band saw comprising:
a main frame;
a lower wheel rotatably carried by said main frame;
an upper wheel rotatably mounted on a sub-frame which is pivotally connected to said main frame to permit variance in the vertical position of said upper wheel in respect to said lower wheel upon pivoting of said sub-frame;
a member connected to said sub-frame for relative movement in respect thereto;
spring means interposed between said member and said sub-frame to exert a bias on said member and sub-frame in a direction tending to separate said member and sub-frame;
adjustable connecting means connecting said member to said main frame to permit said member to be moved between fixed positions away and towards said main frame, such movement being transferred through said spring means to said upper wheel.

2. A band saw according to claim 1 including stop means limiting said relative movement of said member away from said sub-frame, said spring means normally biasing said member against said stop means when a band saw blade is not carried by said wheels, and said member being moved away from said stop means and in opposition to the biasing force of said spring means by said adjustment means when a band saw blade is installed and tensioned, said band saw blade thereby being under a tension force dependent upon the relative position of said member in respect to said sub-frame.

3. A band saw according to claim 2 including indicating means operable to indicate the relative position of said member in respect to said sub-frame thus providing an indication of the amount of tension force of the band saw blade.

4. A band saw according to claim 2 wherein said stop means is adjustable to vary the position to which said spring means can bias said member.

5. A band saw according to claim 4 wherein said member is pivotally connected to said sub-frame and said spring means exerts a bias pivoting said member away from said sub-frame.

6. A band saw according to claim 5 wherein said spring means is compression spring means interposed between said sub-frame and said member.

7. A band saw according to claim 6 wherein said adjustment means is screw type adjustment means.

8. A band saw according to claim 7 including indicating means operable to indicate the relative position of said member in respect to said sub-frame thus providing an indication of the amount of tension force of the band saw blade.

References Cited

UNITED STATES PATENTS 1,879,145    9/1932    Erickson _____ 143—27 X
2,903,027    9/1959    Edgemond et al. _____ 143—27

DONALD R. SCHRAN, *Primary Examiner.*